United States Patent
Nicholl et al.

(10) Patent No.: US 6,433,099 B1
(45) Date of Patent: Aug. 13, 2002

(54) FINE TEXTURED POWDER COATINGS FOR WOOD SUBSTRATES

(75) Inventors: Edward G. Nicholl, Reading; Jill A. Ottinger, Stowe, both of PA (US)

(73) Assignee: Rohm & Haas Company, Philadelphia, PA (US)

( * ) Notice: Subject to any disclaimer, the term of this patent is extended or adjusted under 35 U.S.C. 154(b) by 13 days.

(21) Appl. No.: 09/628,066

(22) Filed: Jul. 28, 2000

(51) Int. Cl.[7] .................. C08G 59/42; C08L 33/14; C08L 63/00
(52) U.S. Cl. .............. 525/327.3; 525/934; 525/375
(58) Field of Search ................ 525/327.3, 340, 525/375, 934

(56) References Cited

U.S. PATENT DOCUMENTS

| | | | |
|---|---|---|---|
| 4,237,037 A | 12/1980 | Takahashi | 260/28.5 |
| 4,346,144 A | 8/1982 | Craven | 428/335 |
| 4,390,664 A | 6/1983 | Kanayama | 525/117 |
| 5,212,263 A | 5/1993 | Schreffler | 525/533 |
| 5,470,893 A | 11/1995 | Sinclair-Day et al. | 523/205 |
| 5,721,052 A | 2/1998 | Muthiah et al. | 428/413 |
| 5,856,378 A | 1/1999 | Ring et al. | 523/205 |
| 5,925,285 A | * 7/1999 | Ramesh | 252/182.28 |
| 6,093,774 A | 7/2000 | Dumain | 525/207 |
| 6,130,297 A | * 10/2000 | Ramesh | 525/327.3 |

OTHER PUBLICATIONS

Henry, Lee et al. Handbook of Epoxy Resins (Mar. 21, 1967), pp. 10–17, 11–17, 11–18, & 12–3.

* cited by examiner

*Primary Examiner*—Donald R. Wilson

(57) ABSTRACT

Thermosetting powder coating composition adapted to provide a uniform, fine textured finish onto heat sensitive substrates, without damaging the substrate while curing the coating. The composition comprises a glycidyl methacrylate resin, 1,3,5-tris-(2-carboxyethyl)isocyanurate, a catalyst and, optionally, a second curing agent selected from the group consisting of difunctional and trifunctional carboxylic acids. The composition according to the present invention provides a fine texture finish without the need to add texturizing agents. The composition may be cured at temperatures below 300° F. so as to not damage the heat sensitive substrate.

11 Claims, No Drawings

FINE TEXTURED POWDER COATINGS FOR WOOD SUBSTRATES

The present invention relates to powder coating compositions which may be applied to heat sensitive substrates, such as wood, fibreboard or the like. These compositions produce a fine, uniformly distributed textured finish on these heat sensitive substrates.

BACKGROUND OF THE INVENTION

Powder coatings are dry, finely divided, free flowing solid materials at room temperature. They have gained considerable popularity in the surface coatings industry for numerous reasons. For one, since they are virtually free of the harmful fugitive organic solvents which are normally present in liquid coatings, they are considered safer to handle and apply. Further, their use results in less damage to the environment caused by the release of potentially harmful solvents.

Powder coatings are very convenient to use in that they may be easily swept up in the event of a spill. No special containment devices or procedures are needed as would be required for handling liquid coating formulations. Further, powder coatings are essentially 100% recyclable. Oversprayed powders can be fully reclaimed and recombined with the powder feedstock. This factor provides for a more efficient industrial process and substantially reduces the amount of waste generated. In contrast, oversprayed liquid coatings are not recycled which results in an overall increase in the amount of waste generated. This adds significant costs to the coating process and further burdens the environment in general by increasing the amount of hazardous waste being generated.

The furniture making industry has long desired a coating for heat-sensitive substrates which, when cured, provides a uniformly distributed, fine textured finish. Thermofused vinyl laminates have traditionally provided very fine textured finishes. However, the process of applying vinyl laminates to wood-like substrates is difficult to control and the uniform quality of the surface finish is often inconsistent, especially around the corners and edges of the substrate. Attempts to solve these various problems with powder coatings have, heretofore been unsuccessful.

Historically, powder coatings have been utilized with metallic substrates which can withstand the high temperatures required to cure the coating. Recently, however, coatings have been developed which permit curing at lower temperatures, thus substantially reducing both the chance of charring and the excessive outgassing of moisture from the substrate. A controlled amount of moisture in the wood substrate is essential to the formation of a uniformly bonded coating. U.S. Pat. No. 5,721,052 discloses an epoxy based powder coating system which is able to be cured at lower temperatures. However, in order to give the cured coating a finely textured finish, conventional texturizing agents are employed. Examples of such texturizing agents are PTFE, various PTFE/wax mixtures, organophilic clays and modified rubber particles. These materials, however, produce textures which are too bold when compared to vinyl laminates and often look mottled or blotchy when applied over a large surface such as a cabinet door or counter top. U.S. Pat. No. 5,212,263 discloses a fine texture finish without the use of conventional texturizing agents, but its system employs a mixture of an epoxy resin, methylene disalicylic acid and isopropyl imidazole Bis-A epoxy resin adduct that must be cured at 375° F. Because of the high cure temperature, metal is disclosed as the substrate of choice.

Another problem encountered when searching for a powder coating for wood substrates is the relatively narrow temperature differential between the extrusion process, which is required to uniformly mix the various coating ingredients prior to creating the powder, and the cure temperature. For example, extrusion temperatures may reach 250° F. while the desired cure temperature may only be 250–275° F. Careful control of the extrusion and cure temperatures is essential.

STATEMENT OF INVENTION

It is therefore an object of the present invention to provide a powder coating suitable for application onto heat-sensitive substrates which, when cured, exhibits a uniformly distributed fine textured finish.

It is another object of the present invention to provide a method of coating fine textured finish onto heat sensitive substrates, particularly wood substrates, at cure temperatures of about 300° F. or lower for acceptable curing oven dwell times by use of the inventive powder coating having rapid cure and/or low temperature cure properties without damaging or adversely affecting the physical or physiochemical properties of the substrate.

The present invention provides a powder coating consisting of a glycidyl methacrylic (GMA) resin which is cured with either difunctional or trifunctional carboxylic acids, and 1,3,5-tris (2-carboxyethyl)isocyanurate at low temperatures in the presence of a catalyst. This powder coating may be applied to the surfaces of wood substrates, without damage thereto, to provide a uniform fine textured finish without the need to add a texturizing agent.

DETAILED DESCRIPTION

The powder coating of this invention is intended for use on heat sensitive substrates such as, for example, wood and wood-like materials. For the purposes of this invention, wood may be defined as any lignocellulosic material whether it comes from trees or other plants and whether it be in its natural forms, shaped in a saw mill, separated into sheets and made into plywood, chipped and made into particle board or had its fibers separated, felted and compressed.

The glycidyl methacrylate (GMA) resin is in the form of a copolymer which may be produced by copolymerizing between 20 and 100 wt % gylcidyl acrylate or glycidyl methacrylate and between 0 and 80 wt % other alpha, beta ethylenically unsaturated monomers, such as methyl methacrylate, butyl methacrylate and styrene. Such resin typically has a weight average molecular weight of from about 3,000 to about 20,000, and preferably from about 3,000 to about 20,000, as determined by gel permeation chromatography. The glass transition temperature Tg) of the GMA is preferably between about 40° and 70° C. Its viscosity is referably in the range of between about 10 and 500 poise, and most preferably between about 30 and 300 poise at 150° C., as determined by an ICI Cone and Plate Viscometer.

The GMA can be prepared under traditional reaction conditions known in the art. For instance, the monomers can be added to an organic solvent such as xylene and the reaction conducted at reflux in the presence of an initiator such as azobisisobutyronitrile or benzoyl peroxide. An exemplary reaction may be found in U.S. Pat. No. 5,407,706. In addition, such resins are commercially available under the trademark "ALMATEX" from Anderson Development Company of Adrian, Mich. The GMA resin is present in the powder coating composition in an amount ranging from about 20 to 100 phr (parts per hundred parts resin plus curing agent).

The choice of the curing agents is critical to achieve the desired end product manufactured via the narrow process parameters required by heat sensitive substrates. The 1,3,5-tris-(2-carboxyethyl)isocyanurate (TCI) can be prepared by the reaction of cyanuric acid and acrylonitrile as set forth, for example, in U.S. Pat. No. 3,485,833. In the alternative, TCI may be acquired commercially from Cytec Industries, Inc. of Stamford, Conn. It may be added to the powder coating composition in an amount ranging from 1 to 20 phr, preferably 12 to 18.

A second curing agent selected from the group consisting of difunctional or trifunctional carboxylic acids and polyanhydrides of aliphatic dicarboxylic acids may also be utilized. The functionality number relates to the number of —COOH moieties on the molecule. Preferred are the difunctional carboxylic acids, and sebacic acid and polyanhydrides of aliphatic carboxylic acids are the most preferred. These products are well known curing agents which came readily commercially available, While the second curing agent is a desired component of the inventive formulation, it has been found that the objectives of the invention may be achieved without its presence. However, the preferred embodiment includes this ingredient. Sebacic acid may be present in the formulation in an amount up to 7 phr (i.e., from 0 to 7 phr). The polyanhydride of an aliphatic dicarboxylic acid, such as VXL 1381, available commercially from Vianova, may be used in an amount up to 24 ph, and preferably 5–17 phr. In addition, a mixture of sebacic acid and polyanhydride maybe used.

In order to conduct the reaction at the desired rate, a catalyst is required. Catalysts having utility within the boundaries of this invention are the imidazoles, the phosphines, phosphonium and ammonium. Of these, imidazoles are most preferred. Examples of such imidazoles are 2-phenyl-imidazoline, 2-methylimidazole, a 2-methylimidazole epoxy adduct, a substituted imidazole (50% active on castor oil) and an isopropyl imidazole Bis-A epoxy resin adduct. A preferred catalyst for curing the inventive powder coating onto wood substrates is an isopropyl imidazole Bis-A epoxy resin adduct. The imidazole itself is insoluble in GMA copolymer systems. Therefore, the purpose for adducting it to the epoxy resin is to make it compatible with this system. This catalyst is commercially available from the Ciba-Geigy Corporation under the trade name HT-3261. This catalyst is added in an amount ranging from 1 to 10 phr, and preferably 2 to 5 phr.

The powder coating composition may also contain fillers or extenders. These extenders include, without limitation, calcium carbonate, barium sulfate, wollastonite and mica. They may be added to the powder coating composition in amounts ranging up to 120 phr, preferably between 10 and 80 phr.

Further, the powder coating composition of the present invention may include traditional additives to impart various physical characteristics to the finished coating or to assist in the formulating and application of the composition. Such additives include, without limitation, flow additives, degassing agents, gloss control waxes, such as polyethylene, and slip additives, such as siloxanes.

The powder coating compositions of this invention are prepared by conventional techniques employed in the powder coatings art. Typically, the components of the powder coating are thoroughly blended together and then melt blended in an extruder. Melt blending is typically carried out in the temperature range of between 140° and 180° F. with careful control of the extrudate temperature to minimize any premature curing of the powder coating formulation in the extruder. These extruder temperatures are lower than the typical cure temperatures of the powder coating which may begin initial curing at temperatures as low as 250° F. The extruded composition, usually in sheet form, after cooling, is ground in a mill, such as a Brinkman mill or Bantam hammer mill, to achieve the desired particle size.

The heat sensitive wood substrates which are targeted for coating by the powder coating of the present invention are, without limitation, hardwood, particle board, medium density fiberboard (MDF), electrically conductive particle board (ECP), masonite or any other cellulosic based materials. Wood substrates which are particularly suitable for use in this invention have a moisture content of from about 3% to 10%. After they are cut, milled, shaped and/or formed, these wood materials are generally used to make articles such as computer furniture, business furniture, ready to assemble furniture, kitchen cabinets and the like.

The powder coating compositions of the present invention have very low cure temperature properties. These properties provide a powder coating it composition which can be readily applied, especially by electrostatic spraying, to heat sensitive materials, particularly wood products, while limiting the substrate heat exposure so as to not cause damage to said substrate. Ideally, the substrate is preheated. In a preferred embodiment, MDF is preheated in an oven for 10 to 15 minutes at @350° F. to 375°F. The substrate is then coated when the board surface temperature reaches between 170° F. and 240° F. The coated substrate is then post cured in an oven set at between 250° F. and 375° F. for from 5 to 30 minutes. The board temperature must not exceed 300° F. The rate of cure is time/temperature dependent. An effective cure may be achieved with a cure temperature as low as 250° F. for a period of 30 minutes. An equally effective cure may be achieved with a cure temperature of up to 375° F., but with a resident oven time of only about 5 minutes at this temperature. After the cure has been achieved, the coated substrate is then air cooled.

It is important to minimize the outgassing from the wood substrate. Significant outgassing will degrade the internal structural integrity of the substrate as well as form large, noticeable surface defects in the finished coating. By providing coatings which cure at lower temperatures, the potential for significant outgassing is reduced or eliminated altogether.

The high viscosity and low melt flow of the inventive compositions permits the cured powder coating to uniformly cover and hide not only the flat surface(s) of the wood substrate but the edges as well, which are highly porous and, therefore, most difficult to uniformly coat in the application process.

The preferred method used to apply the low temperature cure powder coating onto heat sensitive substrates is by electrostatic spraying. The method of the present invention accordingly will be discussed hereinafter with reference to electrostatic spraying methods. However, it should be understood that other fusion coating methods can be employed.

Electrostatic spraying of powder coatings is based upon the principle of electrostatic charging. In electrostatic spraying, the powder particles receive charges by one of the two following methods. In the corona method, the powder coating particles are passed in a carrier gas stream through a corona discharge in a corona spray gun and the charge is transferred from the ionized discharged air molecules to the powder particles, whereby the powder particles become electrostatically charged. In the triboelectric method, use is made of the principle of frictional electricity. The powder particles rub against a friction surface of, usually, polytetrafluoroethylene (TEFLON), in the tribo gun and are given an electrostatic charge which is opposite in polarity to the charge of the substrate surface.

After charging, the particles are ejected as a cloud through the spray gun nozzle by virtue of their charge and output carrier gas pressure to the vicinity of the grounded target substrate. The charged spray particles are attracted to the grounded substrate by virtue of the difference in their respective charges. This causes the particles to deposit as a uniform coating onto the desired substrate, covering the entire substrate including faces and edges. The charged powder adheres to the substrate for a period of time sufficient to permit conveying the coated article to an oven. A subsequent bake, or cure, process in the oven transforms the powder into a uniform, continuous coating having the desired fine texture surface finish characteristics.

The present invention will be further clarified by a consideration of specific examples which are intended to be purely exemplary of the invention. All parts and percentages specified herein are by weight unless otherwise stated.

EXAMPLES

A uniform, fine texture coating was achieved with a powder coating consisting of the ingredients listed in Table 1.

TABLE 1

| Ingredient | phr | Material | Use |
| --- | --- | --- | --- |
| PD 7690 GMA resin (Anderson Development Co) | 80 | glycidyl methacrylate polymer | resin |
| HT 3261 (Ciba Geigy) | 3 | imidazole/epoxy resin adduct | catalyst |
| TCI (Cytec Industries) agent | 16.5 | 1,3,5-tris-(2-carboxyethyl) isocyanurate | cure |
| Sebacic acid agent | 3.5 | | cure |
| TiO2 | 40 | titanium dioxide (white) | pigment |
| Barite 1075 | 10 | barium sulfate | extender |
| Resiflow P-67 agent | 2 | 2-propenoic acid ethyl ester polymer | flow |
| Troy EX542 | 1 | — | degassing additive |
| Various Pigments | 0.182 | | |

The ingredients were then melt blended in an extruder at a temperature of 150° F. The extruded material was mixed with about 0.2% of the dry flow additive Aluminum Oxide C and then ground into a coarse powder. These particles were next ground into a fine powder by use of a high speed Brinkman grinder having a 12-pin rotor and then sieved through a 200 mesh screen.

The fine powder particles were then electrostatically sprayed with a corona discharge gun onto MDF panels which had been pre-heated for 10–15 minutes at 350–375° F. The coated panels were then post cured in an oven set at 350–375° F. for 5–10 minutes. During the time that the panels were in the oven their surface temperatures did not exceed 300° F.

Gel time and hot plate melt flow were tested on the powder coating. MEK resistance and gloss were then tested on the cured panels. The final coating thickness was about 4–7 mils. The resulting properties are summarized in Table 2.

TABLE 2

| Property | Result |
| --- | --- |
| Gel Time at 300° F. | 131 seconds |
| Hot Plate Melt Flow at 300° F. | 13–14 mm |
| 60° Gloss | 9–13 units |
| Appearance | Fine Texture |
| MEK (50 double rubs) | Good (4+) |
| Crosshatch Adhesion | 5B |
| Intercoat Adhesion | 5B |
| KCMA Stain testing | Pass |
| KCMA QUV Exposure | Pass |
| Hot/Cold Cycle | Pass |
| Detergent Resistance | Pass |
| Taber Abrasion | 92 mg loss |

A second example was prepared using the ingredients shown in Table 3.

TABLE 3

| Ingredient | phr | Material | Use |
| --- | --- | --- | --- |
| PD 4219 GMA resin (Anderson) | 80 | gylcidyl methacrylate polymer | resin |
| TCI (Cytec) agent | 8.4 | 1,3,5-tris-(2-carboxyethyl isocyanurate | cure |
| VXL 1381 (Vienova) agent | 17.2 | polyanhydride | cure |
| Sebacic acid agent | 4 | | cure |
| HT 3261 (Ciba-Geigy) | 2 | imidazole/epoxy resin adduct | catalyst |
| Resiflow P-67 agent | 1 | 2-propenoic acid ethyl ester polymer | flow |
| Troy EX 542 | 1 | | degassing additive |
| Barite 1075 | 30 | barium sulfate | extender |
| Nyad 325 | 30 | | filler |
| 305 Green Chromium Oxide | 0.59 | | pigment |
| Omega Green DMY | 1.5 | | pigment |
| Raven Black 22 | 1 | | pigment |
| Yellow 29 | 0.5 | | pigment |
| Titanium Dioxide | 30 | | pigment |

The ingredients from Table 3 were prepared and tested as set forth in the protocol shown above under Table 1. The results are shown in Table 4.

TABLE 4

| Property | Result |
| --- | --- |
| Gel Time at 300° F. | 74 seconds |
| Appearance | Fine Texture |
| 60° Gloss | 25–30 units |
| MEK (50 double rubs) | Good (4+) |

We claim:

1. A powder coating composition for forming a uniform, fine textured finish onto heat-sensitive substrates comprising a glycidyl methacrylate resin, the curing agent 1,3,5-tris(2-carboxyethyl)isocyanurate, an isopropyl imidazole Bis-A epoxy resin add act as a catalyst and, optionally, a second curing agent, selected from the group consisting of difunctional or trifunctional carboxylic acids and polyanhydrides of aliphatic dicarboxylic anhydrides.

2. The composition of claim 1 wherein the catalyst is isopropyl imidazole Bis-A epoxy resin adduct.

3. The composition of claim 1 comprising, based on weight, 20 to 100 parts per hundred parts resin (phr) of the glycidyl methacrylate resin, 1 to 20 phr of 1,3,5-tris(2-carboxyethyl)isocyanurate and 1 to 10 phr of the catalyst.

4. The composition of claim 3 comprising a trifunctional carboxylic acid as the second curing agent.

5. The composition of claim 3 comprising a difunctional carboxylic acid as the second curing agent.

6. The composition of claim 5 wherein the difunctional carboxylic acid is sebacic acid and is present in an amount of up to 7 phr by weight.

7. The composition of claim 3 wherein the second curing agent is a polyanhydride and is present in an amount of up to 24 phr.

8. The composition of claim 5 further comprising up to 24 phr of polyanhydride.

9. The composition of claim 1 wherein the heat sensitive substrate is a lignocellulosic material.

10. The composition of claim 9 wherein the lignocellulosic material is medium density fiberboard.

11. The composition of claim 1, wherein said composition cures at 300° F.

* * * * *